United States Patent
Galfre'

(10) Patent No.: US 10,267,444 B2
(45) Date of Patent: Apr. 23, 2019

(54) RAPID ENGAGEMENT/RELEASE COUPLING

(71) Applicant: Merlo Group Innovation Lab S.r.l., San Defendente di Cervasca (IT)

(72) Inventor: Renato Galfre', San Defendente di Cervasca (IT)

(73) Assignee: MERLO GALFRÉ INNOVATION LAB S.R.L., San Defendente di Cervasca (IT)

( * ) Notice: Subject to any disclaimer, the term of this patent is extended or adjusted under 35 U.S.C. 154(b) by 266 days.

(21) Appl. No.: 15/022,638

(22) PCT Filed: Sep. 19, 2013

(86) PCT No.: PCT/IB2013/058662
§ 371 (c)(1),
(2) Date: Mar. 17, 2016

(87) PCT Pub. No.: WO2015/040455
PCT Pub. Date: Mar. 26, 2015

(65) Prior Publication Data
US 2016/0238171 A1 Aug. 18, 2016

(51) Int. Cl.
*F16L 37/098* (2006.01)
(52) U.S. Cl.
CPC ................. *F16L 37/0985* (2013.01)
(58) Field of Classification Search
CPC .................................................. F16L 37/0985
(Continued)

(56) References Cited

U.S. PATENT DOCUMENTS 3,810,073 A * 5/1974 Zajac ................. H01R 13/6277
24/607
4,660,803 A 4/1987 Johnston et al.
(Continued)

FOREIGN PATENT DOCUMENTS

DE 29921405 U1 4/2001
DE 202005011401 9/2005
(Continued)

OTHER PUBLICATIONS

International Search Report and Written Opinion dated May 19, 2014 for Application No. PCT/IB2013/058662.

*Primary Examiner* — James M Hewitt, II
(74) *Attorney, Agent, or Firm* — Patterson + Sheridan, LLP (57) ABSTRACT

A rapid engagement/release coupling having a female connector, a male connector, and a retaining ring. The female connector having an insertion end, a cylindrical sealing portion, and an annular groove having a first stop surface. The male connector carrying a sealing ring configured to cooperate with the cylindrical sealing portion and having a recessed annular portion having a second stop surface. The retaining ring having a collar and a tubular portion equipped with a plurality of longitudinal splits which divide the tubular portion into a plurality of sectors. The sectors having teeth configured to engage the annular groove, wherein the teeth have outer conical surfaces and inner conical surfaces. The inner and outer conical surfaces of the teeth having different inclination angles with respect to a longitudinal axis. The inclination angle of the outer conical surfaces is greater than the inclination angle of the inner conical surfaces.

11 Claims, 6 Drawing Sheets

(58) Field of Classification Search
USPC .......................................................... 285/322
See application file for complete search history.

(56) References Cited

U.S. PATENT DOCUMENTS

6,267,416 B1 * 7/2001 Ferreira ................ F16L 37/008
                                                                     285/319
6,419,281 B1    7/2002 Salomon-Bahls et al.

FOREIGN PATENT DOCUMENTS

| DE | 10-2006040051 A | * | 4/2007 | ............ F16L 37/098 |
| DE | 102006040051 A1 |   | 4/2007 | |
| EP | 0140995 |   | 5/1985 | |
| EP | 0340518 |   | 11/1989 | |
| EP | 0764808 |   | 3/1997 | |

* cited by examiner

RAPID ENGAGEMENT/RELEASE COUPLING

FIELD OF THE INVENTION

The present invention relates to a rapid engagement/release coupling comprising a male connector and a female connector that can be coupled together, particularly for use in high pressure hydraulic or pneumatic systems.

DESCRIPTION OF THE PRIOR ART

In the state of the art rapid engagement/release couplings are known that are equipped with retaining means for locking a male connector with respect to a female connector.

The document DE 20 2005 011 401 U1 describes a rapid engagement/release coupling, comprising:
- a female connector having a hole with an insertion end, a cylindrical sealing portion and an annular groove located between the insertion end and the cylindrical sealing portion, the annular groove having a first stop surface,
- a male connector carrying a sealing ring configured for cooperating with said cylindrical sealing portion of the female connector and having a recessed annular portion having a second stop surface,
- a retaining ring having a collar and a tubular portion equipped with a plurality of longitudinal splits that divide the tubular portion into a plurality of elastically deformable sectors, said sectors having respective teeth configured for engaging the annular groove of the female connector, wherein said teeth have respective outer surfaces configured for engaging the first stop surface of the female connector and respective inner surfaces configured for engaging the second stop surface of the male connector.

The male connector is axially movable with respect to the retaining ring between a working position and a disengagement position. In the working position the second stop surface of the male connector is in contact with said inner surfaces of said teeth and prevents an inwardly radial deformation of the elastically deformable sectors. In the disengagement position, said recessed annular portion of the male connector is disengaged from said teeth and forms an empty space level with said elastically deformable sectors, in such a way that said elastically deformable sectors are free to radially deform inwardly so that said teeth are free to engage or disengage said annular groove of the female connector after an axial movement of the retaining ring with respect to the female connector.

Similar solutions are described in: DE 299 21 405 U1, and DE 10 2006 040 051 A1.

In couplings of this type the fluid pressure inside the connectors tends to force the male connector outwards. This force that tends to push the male connector outwards is counteracted by the retaining ring.

In the known solutions, the force that tends to push the male connector outwards also tends to push the retaining ring outwards.

The hydraulic forces that tend to push the male connector and the retaining ring outwards are contrasted by the teeth of the elastically deformable sectors of the retaining ring, which are subject to a compressive force.

With very high working pressures, the teeth of the retaining ring are subject to correspondingly high forces. Factors such as the wear of the teeth and the stop surfaces or manufacturing tolerances could impair the ability to resist forces that tend to expel the male connector and the retaining ring, especially in the case of exceptionally high work pressures, or with high frequency pulsating dynamic loads.

OBJECT AND SUMMARY OF THE INVENTION

The present invention aims to provide a rapid coupling which overcomes the problems of the prior art.

According to the present invention, this object is achieved by a rapid coupling having the features described herein.

In the coupling according to the present invention, the inner and outer surfaces of the teeth of the retaining ring are conical surfaces having different inclination angles with respect to a longitudinal axis, with the inclination angle of the outer conical surfaces greater than the inclination angle of the inner conical surfaces.

In this way, the force that tends to push the male connector outwards produces a force that tends to push the retaining ring inwards. This feature makes the connection between the male connector and the female connector safer and insensitive to wear or manufacturing tolerances or errors. The present invention enables the safety of the coupling to increase, especially in the case of exceptionally high working pressures, or with high frequency pulsating dynamic loads.

Preferred embodiments of the invention form the subject of the dependent claims.

The claims form an integral part of the disclosure provided herein relation to the invention.

BRIEF DESCRIPTION OF THE DRAWINGS

The present invention will now be described in detail with reference to the attached drawings, provided purely by way of non-limiting example, wherein.

DETAILED DESCRIPTION OF EMBODIMENTS OF THE INVENTION

With reference to the Figures, numeral 10 indicates a rapid engagement/release coupling according to the present invention. The coupling 10 comprises a male connector 12, a female connector 14 and a retaining ring 16.

The female connector 14 has a hole 18 with a longitudinal axis A and an insertion end 20. The female connector 14 may have a threaded outer portion 22 and a radial collar 24.

Figure 2:
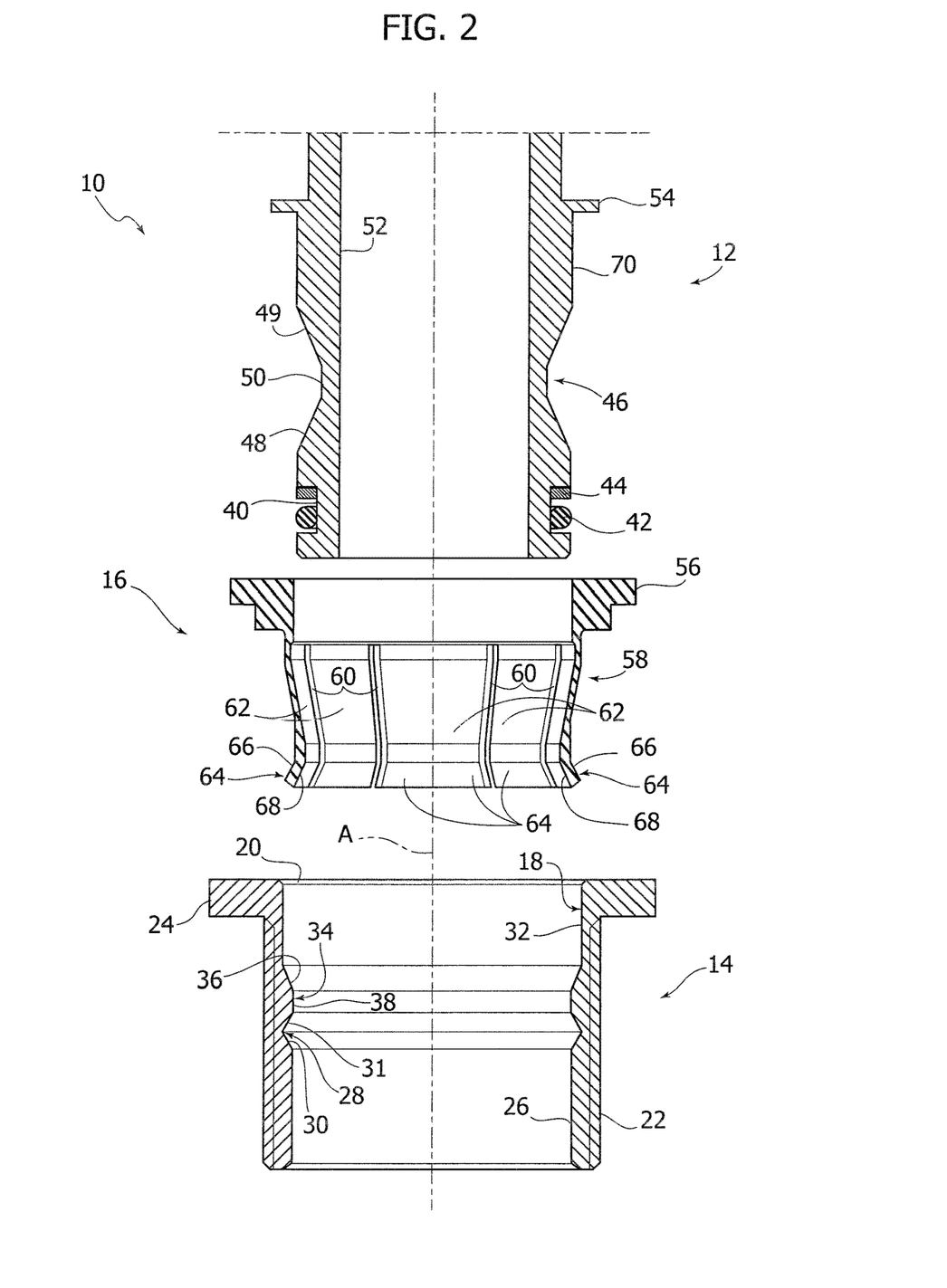
FIG. 2 is an exploded section along the line II-II of FIG. 1.
Figure 3:
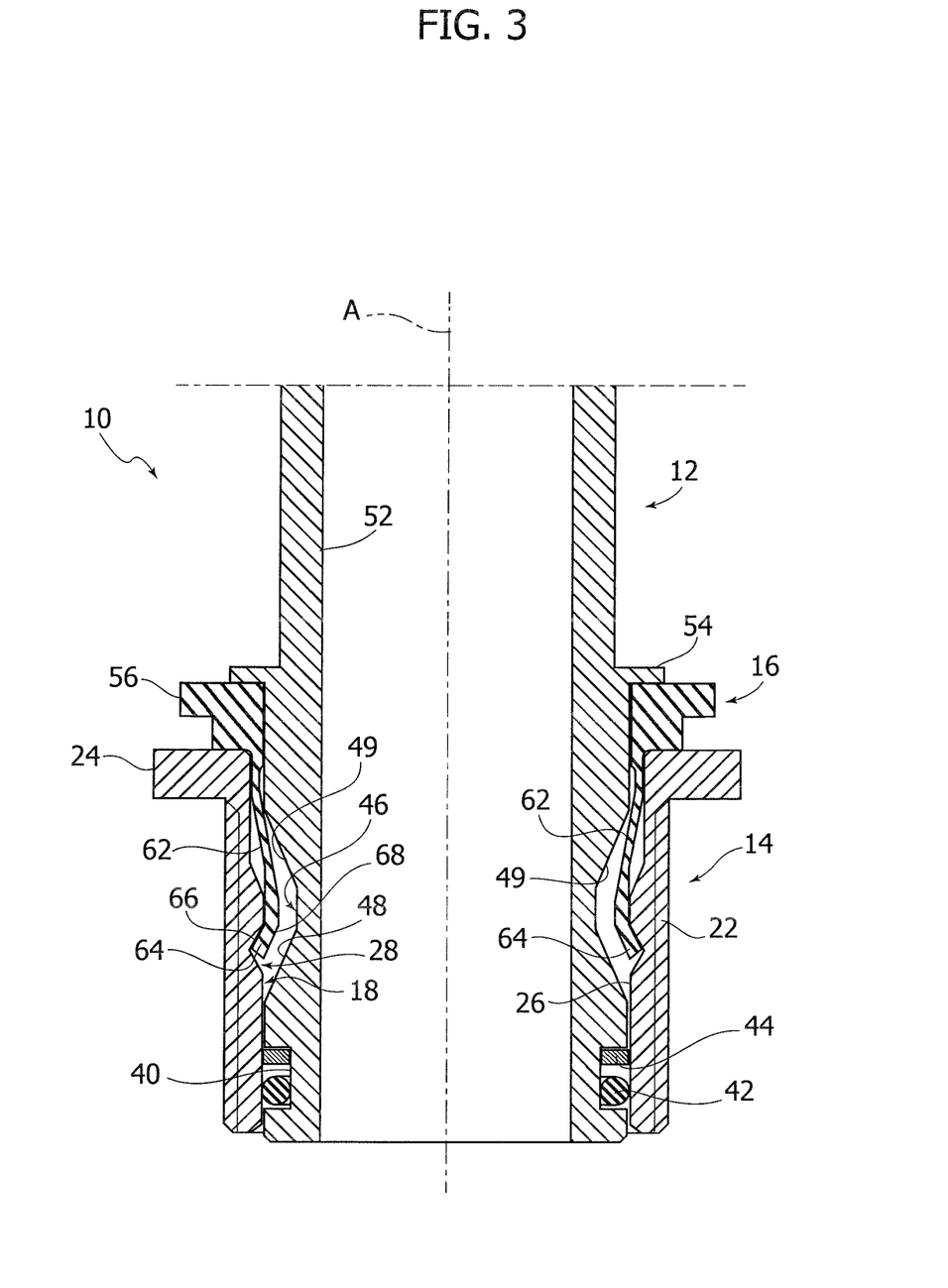
FIG. 3 is a section of the coupling according to the present invention in a position of disengagement.

With reference to FIG. 2, the hole 18 of the female connector 14 has a cylindrical sealing portion adjacent to the end of the hole 18 opposite the insertion end 20. On the wall of the hole 18 an annular retaining groove 28 is formed, arranged between the cylindrical sealing portion 26 and the insertion end 20.

In the example illustrated in the Figures, the annular retaining groove 28 comprises two converging conical walls 30, 31, so as to present a triangular shape in cross-section. The conical surface 31 constitutes a first stop surface, the function of which will be made clear below. The first retaining surface 31 could have a shape that is not conical.

The hole 18 has a cylindrical insertion portion 32 having a diameter greater than the diameter of the cylindrical sealing portion 26. The cylindrical insertion portion 32 is connected to the annular retaining groove 28 by means of a ramp 34. Preferably, the ramp 34 has a conical surface 36 connected to the cylindrical insertion portion 32 and a cylindrical surface 38 connected to the first stop surface 31 of the annular retaining groove 28.

The female connector 14 could be integrally formed within a body of a manifold or at the end of a pipe by means of machining or by plastic deformation that form, in a hole in the manifold or pipe, the cylindrical sealing portion 26, the cylindrical insertion portion 32, the annular retaining groove 28 and the ramp 34.

The male connector 12 has an end portion having an annular groove 40 in which a sealing ring 42 is housed that is intended to establish a sealing contact with the cylindrical sealing portion 26 of the female connector 14. Preferably, within the annular groove 40 of the male connector 12 an anti-extrusion ring 44 is also housed. The end portion of the male connector 12 has a clearance fit with the cylindrical sealing portion 26 of the female connector 14.

On the outer surface of the male connector 12 a recessed annular portion 46 is formed. In the embodiment illustrated in the Figures, the recessed annular portion 46 has two converging conical surfaces 48, 49 and a cylindrical surface 50 which joins together the conical surfaces 48 and 49. The surface 48 of the recessed annular portion 46 constitutes a second stop surface. The second stop surface 48 could have a shape that is not conical.

The male connector 12 also has a through hole 52. The male connector 12 could be full if the production of a blind plug is desired. An outer collar 54 protrudes radially from the outer wall of the male connector.

Figure 1:
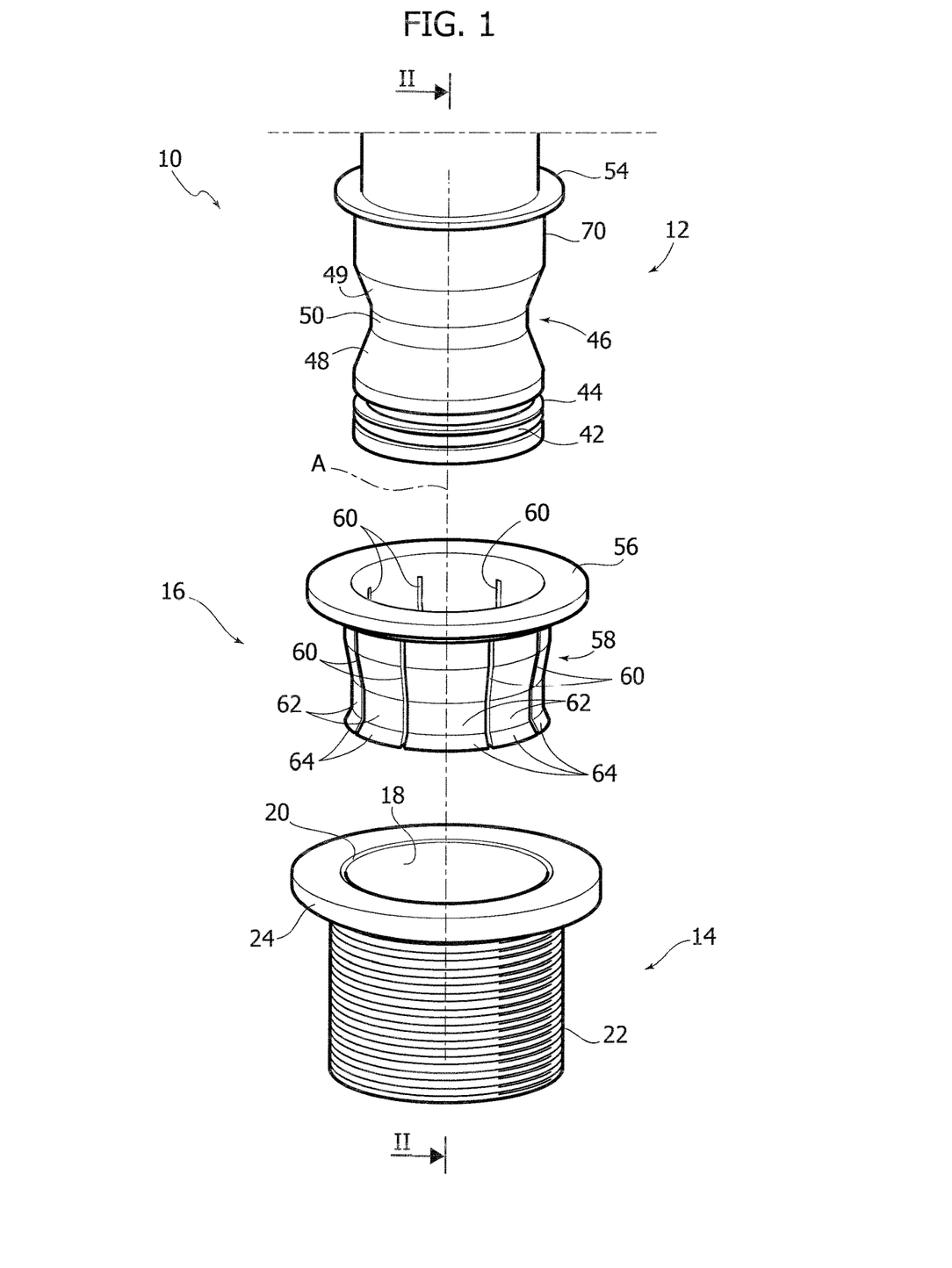
FIG. 1 is an exploded perspective view of a rapid engagement/release coupling according to the present invention.

With reference to FIGS. 1 and 2, the retaining ring 16 has an annular collar 56 from which a tubular portion 58 extends, equipped with a plurality of longitudinal splits 60. The longitudinal splits 60 divide the tubular portion 58 of the retaining ring 16 into a plurality of elastically deformable sectors 62. The elastically deformable sectors 62 are equipped with respective teeth 64 at their distal ends.

Figure 5:
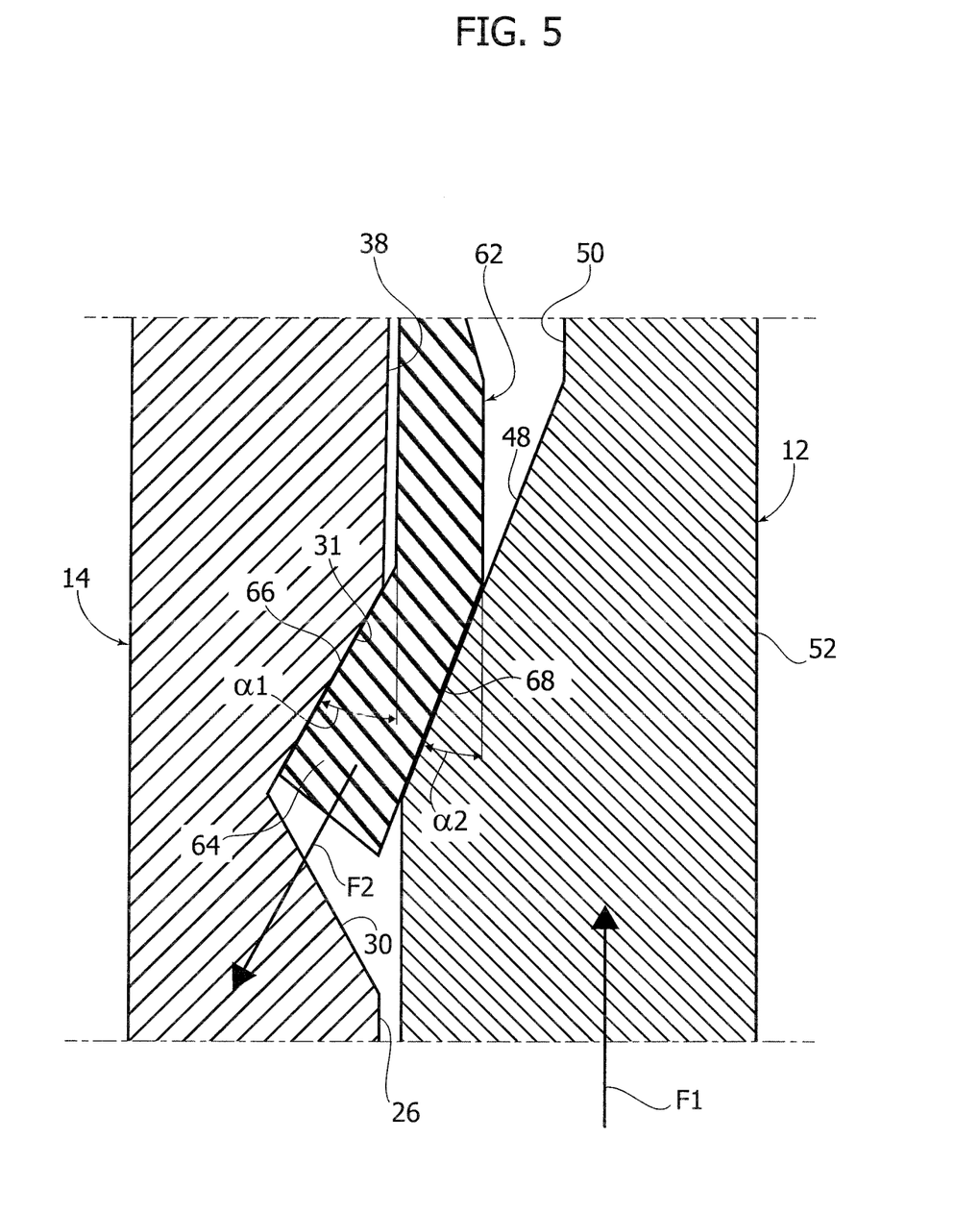
FIG. 5 is an enlarged detail of the part indicated by the arrow V in FIG. 4.

As is illustrated in greater detail in FIG. 5, each tooth 64 has an outer conical surface 66 and an inner conical surface 68. The conical surfaces 66, 68 have respective inclination angles $\alpha 1$, $\alpha 2$ with respect to the longitudinal axis A. The inclination angle $\alpha 1$ of the outer conical surfaces 66 is greater than the inclination angle $\alpha 2$ of the inner conical surfaces 68.

Preferably, the difference between the inclination angle $\alpha 1$ of the outer conical surfaces 66 and the inclination angle $\alpha 2$ of the inner conical surfaces 68 is between 5° and 30°. The inclination angle $\alpha 1$ of the outer conical surfaces 66 can be between 20° and 60°. The inclination angle $\alpha 2$ of the inner conical surfaces 68 can be between 10° and 45°.

Preferably, the first stop surface 31 of the female connector 14 is a conical surface having an inclination angle with respect to the longitudinal axis A equal to the inclination angle $\alpha 1$ of the outer conical surfaces 66.

Preferably, the second stop surface 48 of the male connector 12 is a conical surface having an inclination angle with respect to the longitudinal axis A equal to the inclination angle $\alpha 2$ of the inner conical surfaces 68.

The retaining ring 16 could be made of two different materials: a more elastic material forming the elastically deformable sectors 62, and a material more resistant to compression forming the teeth 64.

The retaining ring 16 is inserted on a cylindrical portion 70 of the male connector 12. When the retaining ring 16 is inserted into the male connector 12, the elastically deformable sectors 62 extend in part inside the recessed annular portion 46. In this way, the retaining ring 16 cannot be extracted from the male connector 12 without a certain force.

The male connector 12 is free to move in the axial direction with respect to the retaining ring 16 between a position of insertion/extraction and a working position.

In the position of insertion/extraction, the collar 54 of the male connector 12 is in contact with the collar 56 of the retaining ring 16. In this position, the recessed annular portion 46 of the male connector 12 is disengaged from the teeth 64 and forms an empty space level with the elastically deformable sectors 62. Therefore, the elastically deformable sectors 62 are free to deform inwardly in the radial direction.

In this position, the male connector 12 with the retaining ring 16 mounted on it can be inserted into the hole 18 of the female connector 14. During insertion, the teeth 64 of the elastically deformable sectors 62 slide on the conical surface 36 of the hole and deform radially within the recessed annular groove 46 of the male connector 12. When the collar 56 of the retaining ring 16 comes into abutment with the collar 24 of the female connector 14, the teeth 64 of the retaining ring 16 elastically return to their rest position and snap-engage the annular retaining groove 28 of the female connector 14.

Figure 4:
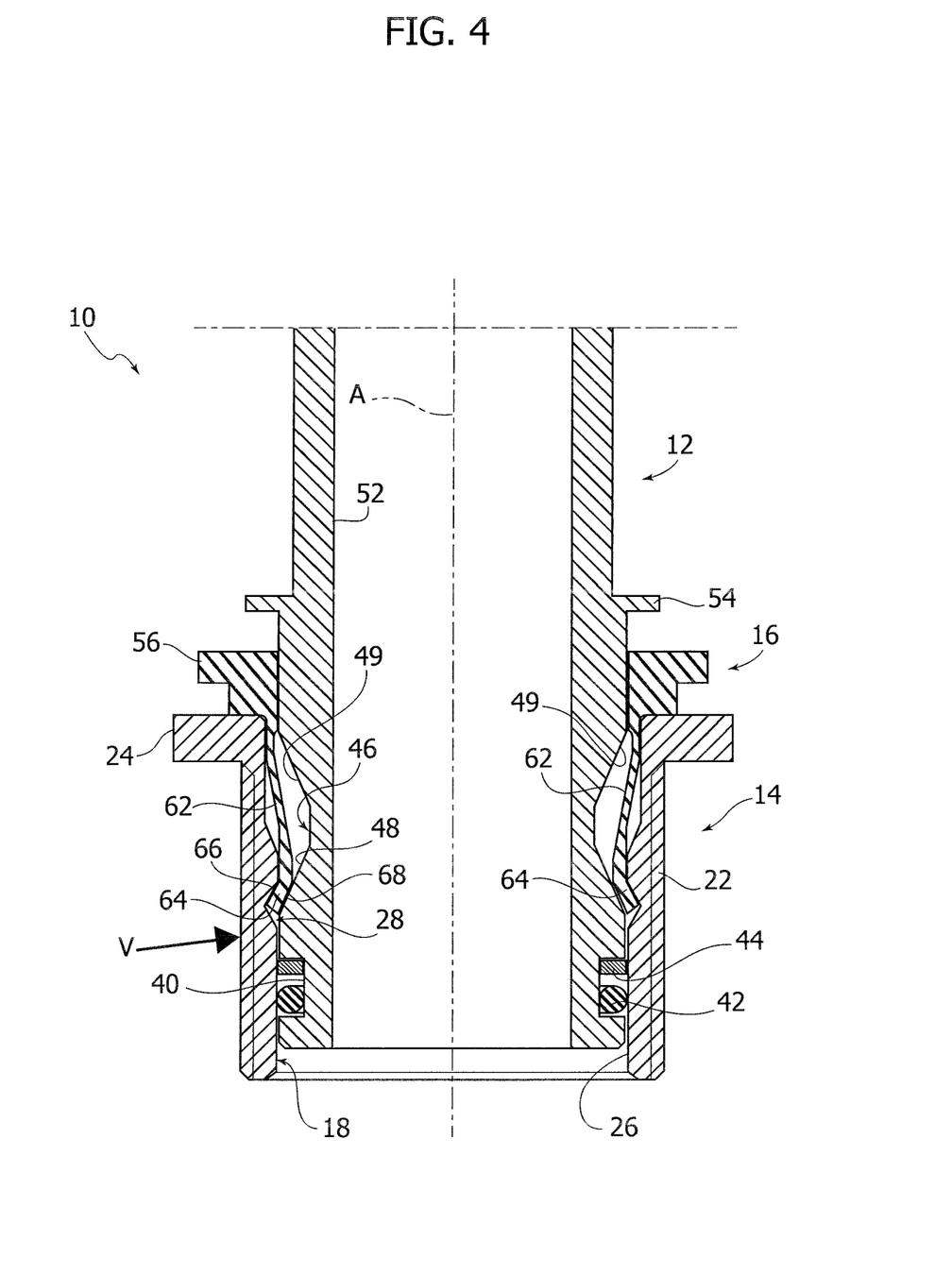
FIG. 4 is a section of the coupling according to the invention in a working position.

When the coupling 10 is pressurized, the pressure of the fluid moves the male connector 12 into the working position illustrated in FIG. 4. In this position, the second stop surface 48 of the recessed annular portion 46 of the male connector 12 comes into abutment against the inner conical surfaces 68 of the teeth 64 of the retaining ring 16. The outer conical surfaces 66 of the teeth 64 are pressed into contact against the first stop surface 31 of the annular groove 28 of the female connector 14.

In the working position of FIG. 4, the conical surface 48 of the male connector 12 prevents an inward radial deformation of the elastically deformable sectors 62 of the retaining ring 16. The male connector is locked axially with respect to the female connector 14 by the contact between the second stop surface 48 with the inner conical surface 68.

Figure 6:
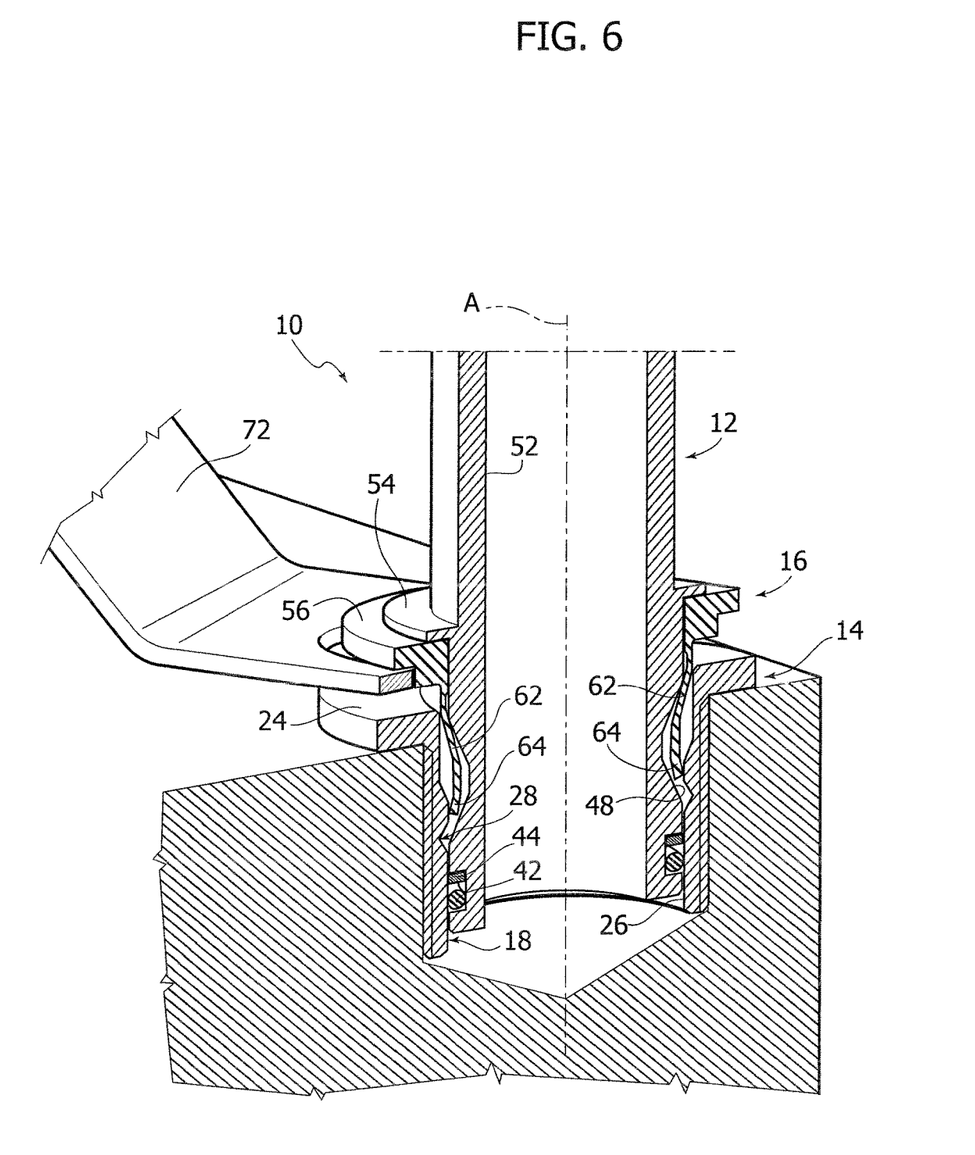
FIG. 6 is a partially sectioned perspective view illustrating the release step of the coupling according to the invention.

To remove the male connector 12 it is first necessary to press the male connector 12 towards the female connector 14 until the collar 54 of the male connector 12 is in abutment with the collar 56 of the retaining ring 16. Then, the retaining ring 16 is pushed outwards, for example by using a tool 72 (FIG. 6) which can be inserted between the collar 56 of the retaining ring 16 and the collar 24 of the female connector 14. With the male connector 12 in the disengagement position the retaining teeth 64 of the retaining ring 16 are radially deformed inwards during the extraction of the retaining ring 16 and pass over the ramp 34. This is possible due to the fact that in this condition the empty space formed by the recessed annular portion 46 of the male connector 12 allows the inward deformation of the elastically deformable sectors 62.

The fact that to remove the male connector 12 it is necessary to push the male connector 12 towards the female connector 14 is a safety factor. In fact, when the coupling is pressurized it becomes difficult or even impossible (when the pressure is very high) to manually push the male connector 12 into the disengaged position. In this way, it is inherently ensured that the disengagement maneuver can only be performed with depressurized machinery.

With reference to FIG. 5, when the coupling is pressurized, the male connector is subjected to a pressure force F1 that tends to push the male connector outwards with respect to the coupling. The force F1 is discharged on the female connector 14 through the conical surfaces 66, 68 of the teeth 64. Given that the outer conical surfaces 66 have an inclination greater than the inner conical surfaces 68, the teeth 64 are subject to a force F2 which tends to push the retaining ring 16 inwards with respect to the coupling. Therefore, during operation, the retaining ring 16 is constantly pressed inwards with respect to the coupling. This ensures the impossibility of the disengagement of the male connector in any operating condition, even in the presence of wear of the contact surfaces and/or external accidental actions. Furthermore, additional elastic elements are not necessary to inwardly force the retaining ring 16.

Of course, without prejudice to the principle of the invention, the details of construction and the embodiments may vary widely with respect to those described and illustrated without departing from the scope of the invention as defined by the claims that follow.

The invention claimed is:

1. Rapid engagement/release coupling, comprising:
a female connector having a hole with an insertion end;
a cylindrical sealing portion;
an annular groove located between the insertion end and the cylindrical sealing portion, the annular groove having a first stop surface;
a male connector carrying a sealing ring configured to cooperate with the cylindrical sealing portion of the female connector and having a recessed annular portion having a second stop surface;
a retaining ring having a collar and a tubular portion equipped with a plurality of longitudinal splits that divide the tubular portion into a plurality of elastically deformable sectors, the sectors having respective teeth configured to engage the annular groove of the female connector, wherein the teeth have respective outer surfaces configured to engage the first stop surface, and respective inner surfaces configured to engage the second stop surface;
wherein the male connector is axially movable with respect to the retaining ring between a working position and a disengaged position, wherein in the working position, the second stop surface of the male connector is in contact with the inner surfaces of the teeth and prevents an inwardly radial deformation of the elastically deformable sectors and wherein in the disengagement position, the recessed annular portion of the male connector is disengaged from the teeth and forms an empty space level with the elastically deformable sectors, in such a way that the elastically deformable sectors are free to deform radially inwards so that the teeth are free to engage or disengage the annular groove of the female connector following an axial movement of the retaining ring with respect to the female connector; and
wherein the inner and outer surfaces of the teeth are conical surfaces with linear cross-sections having different inclination angles with respect to a longitudinal axis, the inclination angle of the outer conical surfaces being greater than the inclination angle of the inner conical surfaces, and
wherein, when male connector is in the working position with respect to the retaining ring and the teeth are engaged with the annular groove of the female connector:
the outer conical surfaces have surface-to-surface contact, at the corresponding inclination angles, with the first stop surface, and
the inner conical surfaces have surface-to-surface contact, at the corresponding inclination angles, with the second stop surface.

2. Coupling according to claim 1, wherein the difference between the inclination angle of the outer conical surfaces and the inclination angle of the inner conical surfaces is between 5° and 30°.

3. Coupling according to claim 1, wherein the inclination angle of the outer conical surfaces is between 20° and 60°.

4. Coupling according to claim 1, wherein the inclination angle of the inner conical surfaces is between 10° and 45°.

5. Coupling according to claim 1, wherein the first stop surface is a conical surface having an inclination angle with respect to the longitudinal axis equal to the inclination angle of the outer conical surfaces.

6. Coupling according to claim 1, wherein the second stop surface is a conical surface having an inclination angle with respect to the longitudinal axis equal to the inclination angle of the inner conical surfaces.

7. Coupling according to claim 1, wherein the retaining ring is made from two different materials: a more elastic material forming the elastically deformable sectors and a material more resistant to compression forming the teeth.

8. Coupling according to claim 1, wherein the female connector is formed within a body of a manifold through machining of the tool.

9. Coupling according to claim 1, wherein the female connector is formed at an end of a tubular.

10. Coupling according to claim 1, wherein the female connector is integrally formed within a body of a tubular.

11. Rapid engagement/release coupling, comprising:
a female connector having a hole with an insertion end;
a cylindrical sealing portion;
an annular groove located between the insertion end and the cylindrical sealing portion, the annular groove having a first stop surface;
a male connector carrying a sealing ring configured to cooperate with the cylindrical sealing portion of the female connector and having a recessed annular portion having a second stop surface;
a retaining ring having a collar and a tubular portion equipped with a plurality of longitudinal splits that divide the tubular portion into a plurality of elastically deformable sectors, the sectors having respective teeth configured to engage the annular groove of the female connector, wherein the teeth have respective outer surfaces configured to engage the first stop surface, and respective inner surfaces configured to engage the second stop surface;
wherein the male connector is axially movable with respect to the retaining ring between a working position and a disengaged position, wherein in the working position, the second stop surface of the male connector is in contact with the inner surfaces of the teeth and prevents an inwardly radial deformation of the elastically deformable sectors and wherein in the disengagement position, the recessed annular portion of the male connector is disengaged from the teeth and forms an empty space level with the elastically deformable sectors, in such a way that the elastically deformable sectors are free to deform radially inwards so that the teeth are free to engage or disengage the annular groove of the female connector following an axial movement of the retaining ring with respect to the female connector; and wherein the inner and outer surfaces of the teeth are conical surfaces with linear cross-sections having different inclination angles with respect to a longitudinal axis, the inclination angle of the outer conical surfaces being greater than the inclination angle of the inner conical surfaces so that, when male connector is in the working position with respect to the retaining ring and the teeth are engaged with the annular groove of the female connector, the respective different inclination angles cause a force due to pressure on the inside of the male connector to push the retaining ring towards the working position and away from the disengaged position.

* * * * *